US012632237B2

(12) United States Patent
Joseph et al.

(10) Patent No.: US 12,632,237 B2
(45) Date of Patent: May 19, 2026

(54) HIERARCHICAL COMPILING AND EXECUTION IN A MACHINE LEARNING HARDWARE ACCELERATOR

(71) Applicant: Google LLC, Mountain View, CA (US)

(72) Inventors: John Navil Joseph, Kirkland, WA (US); Jack Liu, Saratoga, CA (US); Dong Hyuk Woo, San Jose, CA (US); Jing Pu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 127 days.

(21) Appl. No.: 18/561,590

(22) PCT Filed: Jun. 8, 2021

(86) PCT No.: PCT/US2021/036418
§ 371 (c)(1),
(2) Date: Nov. 16, 2023

(87) PCT Pub. No.: WO2022/260656
PCT Pub. Date: Dec. 15, 2022

(65) Prior Publication Data
US 2024/0256239 A1 Aug. 1, 2024

(51) Int. Cl.
*G06F 8/41* (2018.01)
*G06F 9/451* (2018.01)
(52) U.S. Cl.
CPC .............. *G06F 8/451* (2013.01); *G06F 9/451* (2018.02)
(58) Field of Classification Search
CPC ................................. G06F 8/443; G06F 8/451
See application file for complete search history.

(56) References Cited

U.S. PATENT DOCUMENTS 10,841,810 B2 * 11/2020 O'Shea .................. H04W 16/18
11,003,429 B1 5/2021 Zejda et al.
(Continued)

FOREIGN PATENT DOCUMENTS

WO WO 2020/052241 A1 3/2020

OTHER PUBLICATIONS

Ahmed et al., "Adaptive resource management for simultaneous multitasking in mixed-grained reconfigurable multi-core processors," Paper, Presented at the 7th IEEE/ACM/IFIP international conference on Hardware/software codesign and system synthesis, Taipei, Taiwan, Oct. 9-14, 2011; Proceedings of the 7th IEEE/ACM/IFIP international conference on Hardware/software codesign and system synthesis, Oct. 9, 2011, pp. 365-374.
(Continued)

*Primary Examiner* — Duy Khuong T Nguyen
(74) *Attorney, Agent, or Firm* — Fish & Richardson P.C.

(57) ABSTRACT

This disclosure describes a system and method for compiling and executing machine learning inferences in an array of multi-core computing devices. Each multi-core computing device can be an application specific integrated circuit (ASIC) or group of ASICS. In many applications, the array of computing devices changes from inference to inference, and can be adjusted based on the requirements of the inference. Additionally, each ASIC can have multiple processing cores, and multiple types of processing cores. Therefore, performing optimizations and scheduling at compile time, can dramatically increase the efficiency of the array in executing the inference. In some implementations, it is possible to select an amount of time or effort to be spent optimizing during compiling, giving the user flexibility in determining whether to spend time during compilation or during execution.

16 Claims, 9 Drawing Sheets

(56) References Cited

U.S. PATENT DOCUMENTS

| 11,392,845 | B2 * | 7/2022 | Singh | G06Q 10/063 |
| 12,189,629 | B2 * | 1/2025 | Sen | G06F 9/505 |
| 2017/0177415 | A1 | 6/2017 | Dhanraj et al. | |
| 2019/0391796 | A1 | 12/2019 | Brady et al. | |
| 2020/0342286 | A1 | 10/2020 | Zhang | |
| 2022/0043688 | A1 * | 2/2022 | Lai | G06F 9/5055 |
| 2023/0259774 | A1 * | 8/2023 | Wang | G06N 3/04 |
| | | | | 706/15 |
| 2024/0256333 | A1 * | 8/2024 | Weber | G06F 9/5044 |

OTHER PUBLICATIONS

Ambrosi et al., "Hardware-software co-design for an analog-digital accelerator for machine learning," Paper, Presented at the 2018 International Conference on Rebooting Computing, Mclean, VA, Nov. 7-9, 2018; Proceedings of the 2018 International Conference on Rebooting Computing, Apr. 2019, 13 pages.

International Preliminary Report on Patentability in International Appln. No. PCT/US2021/036418, mailed Dec. 21, 2023, 12 pages.

International Search Report and Written Opinion in International Appln. No. PCT/US2021/036418, mailed on Mar. 28, 2022, 20 pages.

Invitation to Pay Additional Fees in International Appln. No. PCT/US2021/036418, mailed on Feb. 7, 2022, 12 pages.

Jozwiak et al., "Modern development methods and tools for embedded reconfigurable systems: a survey," Integration, The VLSI Journal, Jan. 1, 2010, 43(1):1-33.

Kourtis et al., "Compiling neural networks for a computational memory accelerator," Paper, Presented at the 10th Workshop on Systems for Post-Moore Architectures, Heraklion, Greece, Apr. 27, 2020, pp. 1-8.

Nollet et al., "Run-time management of a MPSoC containing FPGA fabric tiles," IEEE Transactions on Very Large Scale Integration (VLSI) Systems, Jan. 1, 2008, 16(1):24-33.

Singh et al., "Mapping on multi/many-core systems: survey of current and emerging trends," Paper, Presented at the 50th Annual Design Automation Conference, Austin, TX, May 29-Jun. 7, 2013; Proceedings of the 50th Annual Design Automation Conference, May 29, 2013, 10 pages.

Office Action in Japanese Appln. No. 2023-571345, mailed on Apr. 22, 2025, 6 pages (with English translation).

Notice of Allowance in Japanese Appln. No. 2023-571345, mailed on Jun. 17, 2025, 5 pages (with English translation).

Notice of Allowance in Korean Appln. No. 10-2023-7038781, mailed on Jan. 27, 2026, 4 pages (with English translation).

* cited by examiner

300

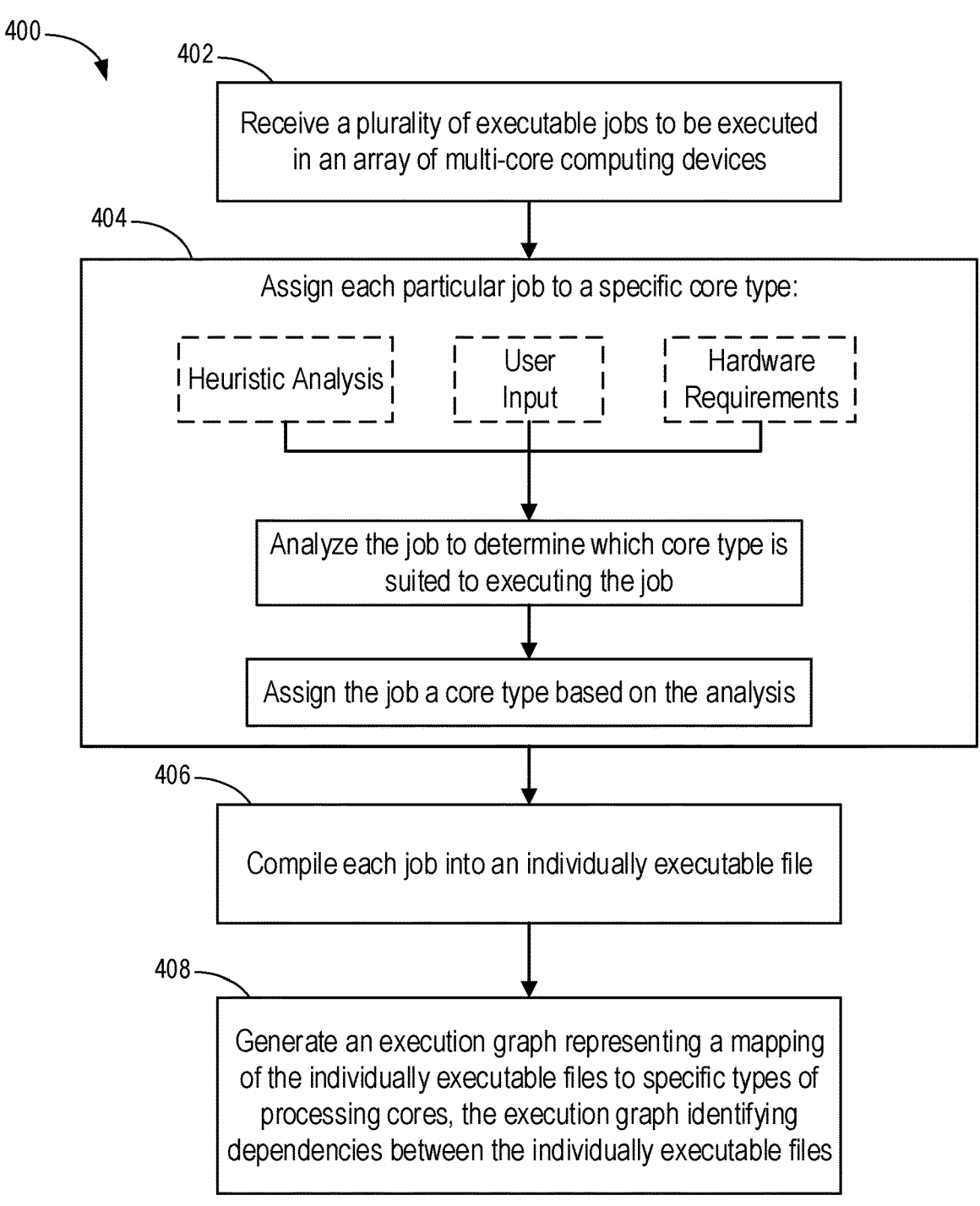

400

402

Receive a plurality of executable jobs to be executed in an array of multi-core computing devices

404

Assign each particular job to a specific core type:

Heuristic Analysis

User Input

Hardware Requirements

Analyze the job to determine which core type is suited to executing the job

Assign the job a core type based on the analysis

406

Compile each job into an individually executable file

408

Generate an execution graph representing a mapping of the individually executable files to specific types of processing cores, the execution graph identifying dependencies between the individually executable files

FIG . 4

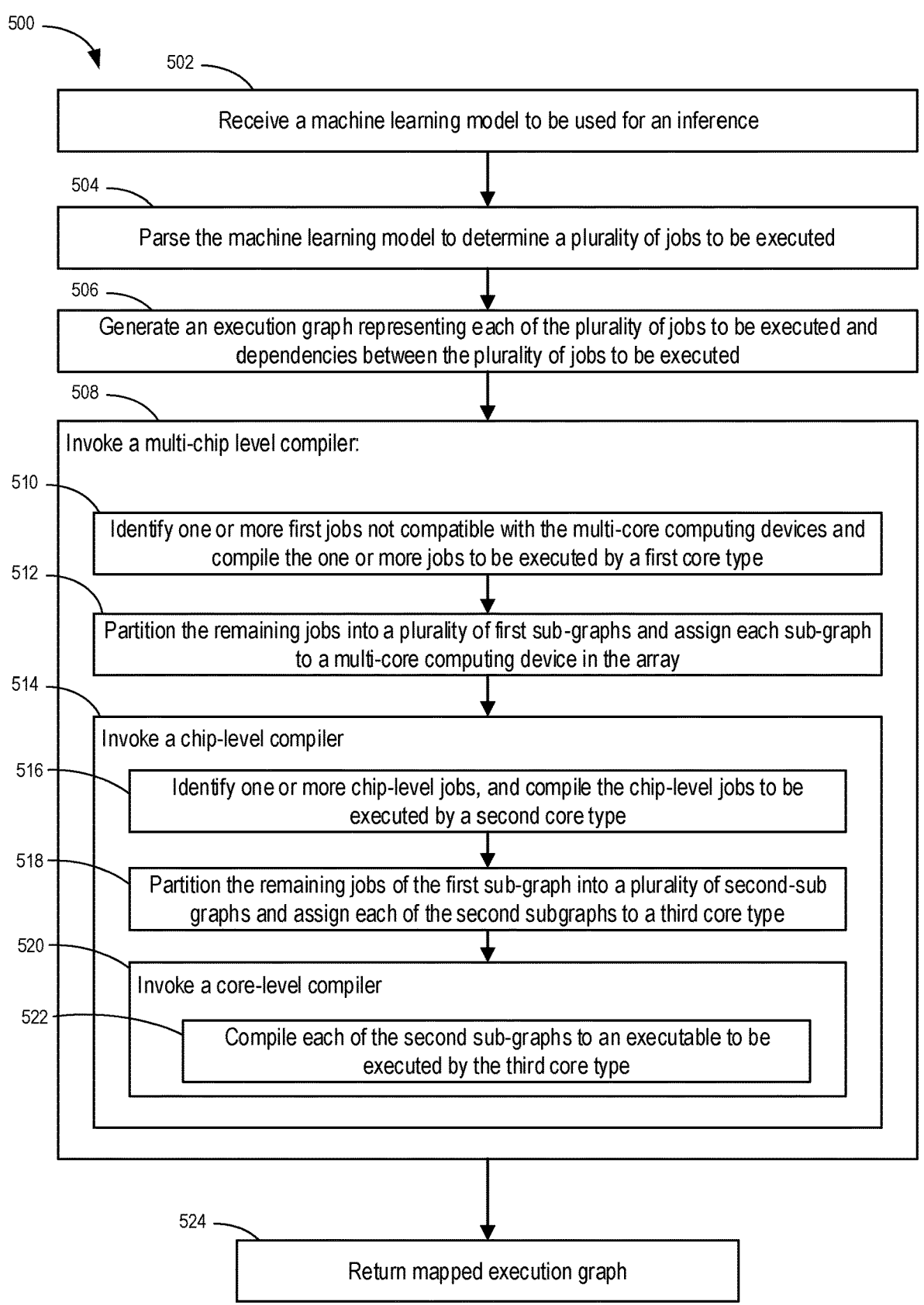

500

502

Receive a machine learning model to be used for an inference

504

Parse the machine learning model to determine a plurality of jobs to be executed

506

Generate an execution graph representing each of the plurality of jobs to be executed and dependencies between the plurality of jobs to be executed

508

Invoke a multi-chip level compiler:

510

Identify one or more first jobs not compatible with the multi-core computing devices and compile the one or more jobs to be executed by a first core type

512

Partition the remaining jobs into a plurality of first sub-graphs and assign each sub-graph to a multi-core computing device in the array

514

Invoke a chip-level compiler

516

Identify one or more chip-level jobs, and compile the chip-level jobs to be executed by a second core type

518

Partition the remaining jobs of the first sub-graph into a plurality of second-sub graphs and assign each of the second subgraphs to a third core type

520

Invoke a core-level compiler

522

Compile each of the second sub-graphs to an executable to be executed by the third core type

524

Return mapped execution graph

FIG . 5

HIERARCHICAL COMPILING AND EXECUTION IN A MACHINE LEARNING HARDWARE ACCELERATOR

CROSS-REFERENCE TO RELATED APPLICATION

This application is a National Stage Application under 35 U.S.C. § 371 and claims the benefit of International Application No. PCT/US2021/036418, filed Jun. 8, 2021, the disclosure of which is hereby incorporated herein by reference.

TECHNICAL FIELD

This disclosure generally relates to compiling and executing code in a machine learning hardware accelerator.

BACKGROUND

Machine learning systems typically undergo a period of training. Using a trained or partially trained machine learning system to perform a task is generally referred to using the system in inference, i.e. processing data to perform the task. Training a machine learning system can involve using the system in inference whilst providing the system with training data.

Machine learning can be implemented on general purpose CPUs (central processing units), and/or on DSPs (digital signal processors), GPUs (graphics processing units) or dedicated machine learning hardware such as TPUs (tensor processing units). Some machine learning systems are implemented in the cloud, but there is a growing need for machine learning systems to be implemented locally or at the "edge", particularly when operating in inference

SUMMARY

This specification is generally concerned with techniques for efficient implementation of machine learning and other computations, in particular at the edge, e.g. in inference. In implementations these combine a computing architecture e.g. a hierarchical architecture, with methods that are adapted to the architecture, for compiling and executing machine learning models.

In one aspect there is described a method for distributing executable jobs in an array of multi-core computing devices. The method comprises receiving a plurality of jobs to be executed in the array of multi-core computing devices, each multi-core computing device comprising a plurality of different types of processing cores, and assigning each particular job of the plurality of jobs to be executed by one of the plurality of different types of processing cores.

The assigning may comprise analyzing the particular job to determine which of the plurality of different types of processing cores is suited to executing the particular job, and assigning the particular job to a core type based on the analysis. Analyzing which core is suited to the particular job may comprise e.g. evaluating one or more metrics of suitability of a core for the job and/or processing data representing the job using a model, which may be a machine learning model, to assign a job to a core either deterministically or stochastically.

The method may further comprise compiling each job of the plurality of jobs into an individually executable file, and generating an execution graph representing a mapping of the individually executable files to specific ones of the plurality of different types of processing cores. In implementations the execution graph identifies dependencies between individually executable files, in particular for distributing the executable jobs to the multi-core computing devices, more specifically to the processing cores. For example, in implementations the dependencies in the execution graph define a sequence in which the jobs should be executed.

The method may include executing the individually executable files. This may involve receiving the execution graph and assigning jobs in the execution graph to a plurality of multi-core computing devices in the array of multi-core computing devices, in particular using the graph and the dependencies it identifies. This may also involve each multi-core computing device executing the assigned jobs, and returning outputs of the executed jobs to a shared memory, and combining the returned outputs to generate an execution graph return.

Analyzing which core is suited to the particular job may include a heuristic analysis e.g. a metric of suitability of a core for the job may include a heuristic metric. A depth of analysis for each particular job may be selected based on a user input prior to compile time. The depth of analysis may be represented by computing resources or time allowed for the analysis e.g. for determining suitability of a core for the job.

The different types of processing cores may include a core of a first type and a core of a second type. The core of the first type may be an ARM processor (core) i.e. a core with a RISC (reduced instruction set computing) architecture. Such an architecture may be characterized by a load/store architecture with single-cycle memory access instructions. The core of the second type may be a TPU (Tensor Processing Unit) or TPU tile processor (core). Such a TPU core may be characterized by hardware configured to implement one or more of the following: tensor operations on tensors with three or more dimensions: matrix-matrix multiplication: integer matrix operations: a systolic array: an activation unit to implement a neural network activation function.

In implementations the execution graph is hierarchical. Thus the execution graph may comprise (hierarchical) sub-graphs arranged in tiers, e.g. at least four tiers. The tiers may include: i) a TPU tier comprising executables to be run on the TPU core type, ii) a chip-level (physical integrated circuit-level) tier comprising one or more sub-graphs of the TPU tier and executables to be run on the ARM core type: iii) a multi-chip tier, comprising two or more chip-level sub-graphs; and iv) a host-level tier, comprising a multi-chip tier sub-graph and one or more sub-graphs configured to be executed on a core of a third type. The core of the third type may be a CPU e.g. a host device CPU. A sub-graph at a tier may comprise a portion of the execution graph, more specifically a portion of the execution graph to be executed at a lower tier: like the execution graph it may define dependencies between jobs or a sequence in which jobs should be executed.

In some implementations a mechanism may be provided to coordinate and sequence operations between the ARM core and TPU core(s) of a multi-core computing device, e.g. ASIC. For example this may comprise code (an "interpreter") that runs on the ARM core e.g. in firmware, that schedules operations for either the ARM core or TPU core(s), e.g. for low latency. This may be used for scheduling and allocating jobs to processing cores at runtime.

In some implementations the execution graph may include one or more constant buffers i.e. memory areas allocated to storing constants. In such cases the constant buffer(s) need not be part of the execution graph itself but instead one or more "out of band buffers" may be associated with the graph at runtime. This can help to keep the graph memory footprint small.

In another aspect there is described a method for compiling executable jobs for execution in an array of multi-core computing devices. In implementations the array of multi-core computing devices is in combination with hardware such as a host system. In implementations the hardware, e.g. host system, comprises a processing core of a first core type. Each multi-core computing device of the array of multi-core computing devices comprises processing cores of a second core type and a third core type.

In implementations the method comprises receiving a machine learning model to be used in inference, parsing the machine learning model to determine a plurality of jobs to be executed, and generating an execution graph representing each of the plurality of jobs to be executed and dependencies between the plurality of jobs to be executed e.g. as previously described.

In implementations the method further comprises invoking a multi-chip level compiler to generate an execution graph e.g. a mapped execution graph. The mapped execution graph may represent a mapping of the individually executable files to specific ones of the plurality of different types of processing cores. In implementations this involves the multi-chip level compiler identifying one or more first jobs of the plurality of jobs to be executed by the first core type, and compiling the one or more first jobs to an executable to be executed by the first core type. In implementations the first jobs are incompatible with the multi-core computing devices in the array. A job may be incompatible with a multi-core computing device if one or more operations of the job cannot be performed on the multi-core computing device, or if the job is not suited to being performed on the multi-core computing device (where suitability may be determined as described previously).

In implementations the method further comprises partitioning the remaining jobs of the execution graph into a plurality of first sub-graphs, assigning each first sub-graph to a particular multi-core computing device of the array of the multi-core computing devices, and invoking, for each first sub-graph, a single-chip level compiler.

In implementations the method comprises the single-chip level compiler identifying one or more chip-level jobs from the first sub-graph to be executed by the second core type, compiling each of the one or more chip-level jobs from the first sub-graph to an executable to be executed by the second core type, partitioning the remaining jobs of the first sub-graph into a plurality of second sub-graphs, and assigning each of the plurality of second sub-graphs to the third core type. In implementations the method further comprises invoking, for each of the plurality of second sub-graphs, a core level compiler, the core level compiler compiling each of the second sub-graphs to an executable to be executed by the third core type.

In implementations the mapped execution graph is for distributing the complied executable jobs e.g. as previously described. Thus the method include using the mapped execution graph for distributing executable jobs e.g. as previously described.

The first, second, and third core types may respectively correspond to the previously described core of the third type, core of the first type, and core of the second type e.g. the first core type may be a (host system) CPU: the second core type may be an ARM (RISC) core; and the third core type may be a TPU (tile) core. Each multi-core computing device of the array may comprise an application specific integrated circuit (ASIC) comprising a TPU.

In implementations identifying the one or more first jobs and/or identifying the one or more chip-level jobs is done based on a heuristic analysis of the plurality of jobs to be executed. The heuristic analysis may be an analysis which involves determining a heuristic metric for each of the jobs. In implementations a depth of heuristic analysis for each particular job, e.g. based on computing resources or time allowed for the analysis, is selected based on a user input prior to compile time.

In implementations the method further comprises receiving, by the array of multi-core computing devices, the mapped execution graph comprising the first jobs, and the plurality of first sub-graphs comprising the one or more chip-level jobs and the plurality of second sub-graphs, assigning the first jobs, chip-level jobs, and remaining jobs in the plurality of second-sub graphs to an associated core of in the array of multi-core computing devices. In implementations the method further comprises, by each core multi-core computing device, executing the assigned jobs and returning outputs of the executed jobs to a shared memory; and combining the returned outputs to generate an execution graph return.

In some implementations the second core type, e.g. an ARM or RISC core, may be assigned a control flow operation which spans the jobs on multiple chips e.g. to facilitate a single chip operation or process, such as a beam search operation or process, followed by a multi-chip operation or process. The method may then involve determining (e.g. using the compiler) a sequence graph which combines multiple first (single chip level) sub-graphs and a reference to a control flow operation to be executed by the second core type, e.g. in another chip (ASIC) such as a master chip (ASIC). The sequence graph may be processed, e.g. by an interpreter, e.g. at runtime, so that the second core type in the master chip controls execution of the multi-chip operation or process over the multiple chips.

Methods, and features of methods, according to the above-described aspects may be combined.

The various implementations provide one or more of the following advantages.

Implementations of the methods provide a hierarchical compiler that generates a hierarchical executable that, at runtime, can span a host CPU as well as firmware in the multi-core computing devices (ASICs). The described hierarchical compiler methods, in combination with a hierarchical architecture comprising different types of hardware resource, facilitate efficient implementation of machine learning and other computations. This is because, in implementations, different types of hardware resource, including ARM cores and TPUs, are exposed to the compiler, e.g. the complier may compile into firmware to be executed on these resources. For example given a machine learning model or other computation the methods can analyze the model or computation and decide the best way, e.g. in terms of performance and power usage, to execute the model/computation using the different hardware units that are exposed to compiler. Also operations can be divided between the different hardware units to limit communication between the CPU and ASIC(s), and to optimize the generated executable code for high-performance and low-power. Still further, a graph of operations may be partitioned so that operations which are less suitable for a TPU core are executed on an ARM core in a low latency manner.

In some implementations the lowest level of the hierarchical architecture is a TPU-only level, followed by a single chip (ASIC) level comprising an ARM core and one or more TPU cores, optionally followed by a multi-chip (multi-ASIC) level, optionally followed by a host (CPU) level. The executable generated at one level of the compiler may be embedded into the executable generated at a higher level and so forth, the executable at a given level being the "contract" between the compiler and the runtime at that level. This approach further facilitates efficient operation because the complier can compile to single chip and multi-chip levels e.g. to implement pipeline parallelism, data parallelism and/or model parallelism, for each chip invoking the single chip level compiler to compile a subgraph that runs on that chip. Code at the multi-chip level may execute on firmware.

In such a hierarchical approach an executable at the single chip level may involve operations on multiple different types of core, e.g. a TPU core and an ARM core. This can facilitate the execution of operations such as beam search and sorting, which are facilitated by the availability of an ARM core in addition to the TPU(s). Also, at the single chip level this approach allows mixed TPU and ARM core operations to execute in parallel whilst streaming and synchronizing data transfers. This synchronization can be expressed through the execution graph.

In implementations, including the host CPU in the hierarchy can further facilitate efficient operation. For example this can allow buffer sharing between the host and ASIC(s) avoiding costly memory copy operations: it can facilitate fine-grained synchronization; and it also facilitates the host CPU consuming data as it is generated by the ASIC(s). The described graph-based job mapping and execution facilitates such partitioning and scheduling.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4 is a flowchart describing an example process for distributing executable jobs in an array of multi-core computing devices.

FIG. 5 is a flowchart describing an example process for compiling executable jobs in an array of multi-core computing devices.

Like reference numbers and designations in the various drawings indicate like elements.

DETAILED DESCRIPTION

This disclosure describes a system and method for compiling and executing machine learning inferences in an array of multi-core computing devices. Each multi-core computing device can be an application specific integrated circuit (ASIC) or group of ASICS. In many applications, the array of computing devices changes from inference to inference, and can be adjusted based on the requirements of the inference. Additionally, each ASIC can have multiple processing cores, and multiple types of processing cores. Therefore, performing optimizations and scheduling at compile time, can dramatically increase the efficiency of the array in executing the inference. In some implementations, it is possible to select an amount of time or effort to be spent optimizing during compiling, giving the user flexibility in determining whether to spend time during compilation or during execution.

Figure 1:
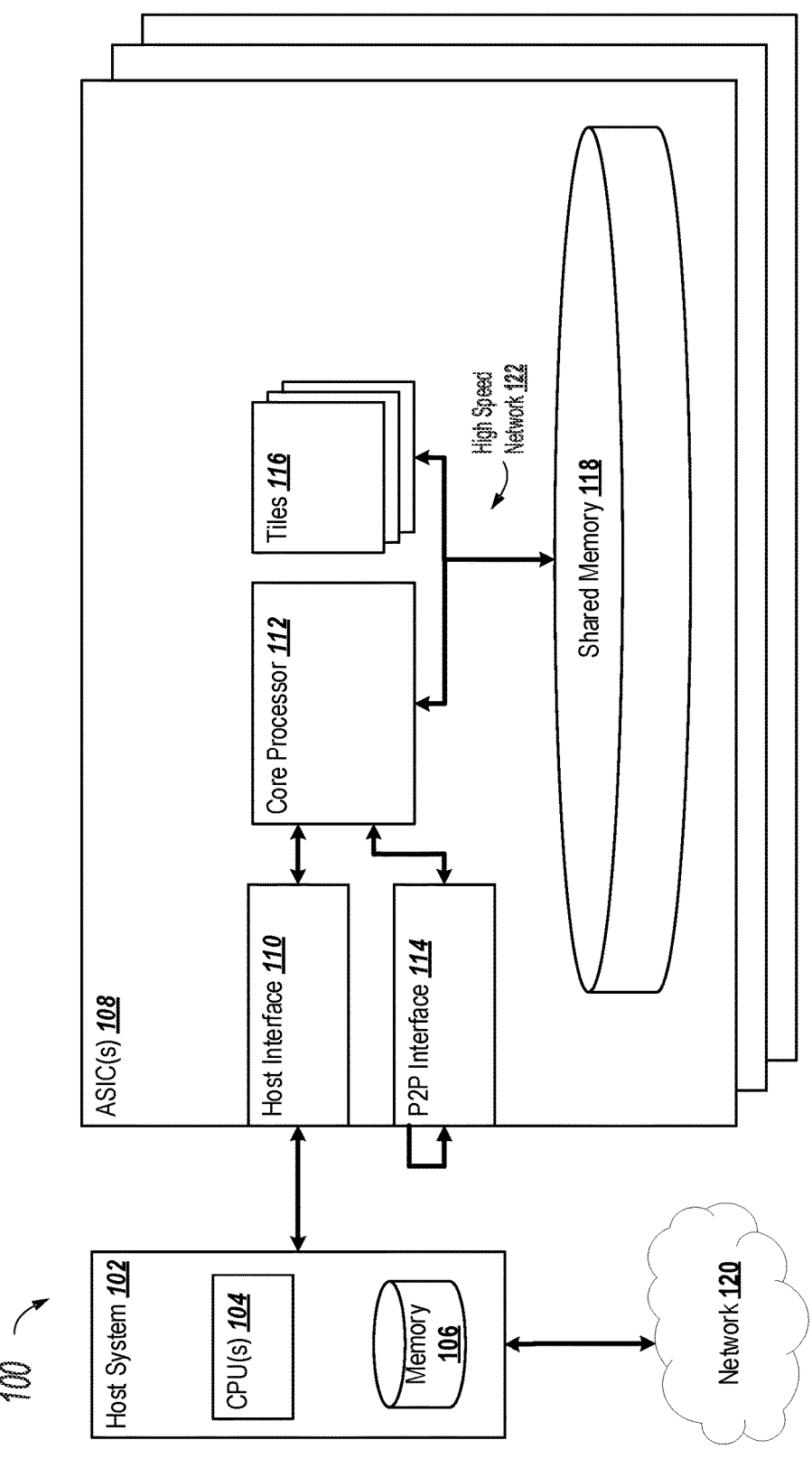
FIG. 1 depicts an example system architecture for a machine learning hardware accelerator that compiles and executes graph executables.

FIG. 1 illustrates an example system architecture for a machine learning hardware accelerator that compiles and executes graph executables. The hardware accelerator 100 includes a host system 102, which directs and coordinates operations, as well as provides an interface between the user and the accelerator 100. The host system 102 interacts with an array of ASICs 108. Each ASIC 108 includes multiple core types and is configured to perform the bulk of the operations during a machine learning inference.

Host system 102 includes one or more central processing units, or CPUs 104. The CPUs 104 can provide processing to the host to perform certain control or logistics operations. In some implementations, the CPU 104 can execute some processes during an inference. Generally, the CPU 104 executes instructions and manipulates data to perform the operations of the host system 102. Each CPU 104 can have a single or multiple core, with each core available to host and execute an individual processing thread. Further, the number of, types of, and particular CPUs 104 used to execute the operations described herein can be dynamically determined based on a number of requests, interactions, and operations associated with the host system 102.

Host system 102 also includes a memory 106. Memory 106 of the host system 102 can represent a single memory or multiple memories. The memory 106 can include any memory or database module and can take the form of volatile or non-volatile memory including, without limitation, magnetic media, optical media, random access memory (RAM), read-only memory (ROM), removable media, or any other suitable local or remote memory component. The memory 106 can store various objects or data, including execution graphs, machine learning models, administrative settings, caches, applications, backup data, and any other appropriate information associated with the host system 102, including any parameters, variables, algorithms, instructions, rules, constraints, or references thereto. While illustrated within the host system 102, memory 106 or any portion thereof, including some or all of the particular illustrated components, can be located, in some instances, remote from the host system 102 in some instances, including as a cloud application or repository, or as a separate cloud application or repository when the host system 102 itself is a cloud-based system. In some examples, the data stored in memory 106 can be accessible, for example, via network 120, and can be obtained by particular applications or functionality of the hardware accelerator 100.

In general, the host system 102 executes higher-level applications in and provides a "front-end" to the user, while distributing the execution graph (described in further detail below) to the array of ASICs 108.

The ASICs 108 in the array include a host interface 110, a core processor 112, an array of tiles 116, which can be the primary compute unit for the ASIC 108, as well as a peer-to-peer interface 114 and a shared memory 118. The core processor 112 can be a processor that performs operations and controls the ASIC 108, and can include for example, ARC, Alpha, Am29000, ARM, Atmel AVR, Blackfin, i860, 1960, M88000, MIPS, PA-RISC, Power ISA, RISC-V, SuperH, SPARC, or other processing architectures.

Shared memory 118 can be a memory accessed by the tiles 116, core processor 112 as well as across multiple ASICs 108, via the high speed network 122. Shared memory 118 can include any memory or database module and can take the form of volatile or non-volatile memory including, without limitation, magnetic media, optical media, random access memory (RAM), read-only memory (ROM), removable media, or any other suitable local or remote memory component. Shared memory 118 can store various objects or data, administrative settings, caches, applications, backup data, repositories storing dynamic information, and any other appropriate information associated with the hardware accelerator 100, including any parameters for inference, variables, algorithms, instructions, rules, constraints, or references. Shared memory 118 includes a shared address space, which is used by each of the plurality of tiles 116 in the ASIC 108.

The host interface 110 is used to coordinate and manage communication between the ASIC 108 and the host system 102. Generally, the host interface 110 comprises logic encoded in software and/or hardware in a suitable combination and operable to communicate with the host system 102 and other components. More specifically, the interface 110 can comprise software supporting one or more communication protocols associated with communications such that the network 110 and/or interface's hardware is operable to communicate physical signals within and outside of the illustrated accelerator 100. Still further, the interface 110 can allow the ASIC 108 to communicate with the host system and/or the network 120 to perform the operations described herein.

A peer-to-peer interface 114 can be similar to the host interface 110 except it provides for and manages communication from ASIC 108 to ASIC 108. In this manner, the ASICs 108 can distribute compute jobs between themselves, as well as share returns or intermediate parameters. Peer-to-peer communication can minimize load on the host system 102 and its associated CPU 104, and provide a scalable solution. This enables a system 100 with an arbitrarily large number of ASICs 108, which is not limited by the host system 102 or CPU 104.

The ASIC can include a core processor 112 such as an Advanced RISC Machine (ARM) core. The core processor 112 can handle control and administration of jobs and tasks that are to be distributed amongst the tiles 116. The core processor 112 performs computational operations and management of the ASIC 108. Additionally, some operations during inference may be more efficiently or rapidly performed on the core processor 112. The core processor 112 directs and instructs the tiles 116 in computations. It maintains one or more contexts, which define the information required to perform an inferences process. Each context can include, but is not limited to, instructions, activation data, parameters, hardware states, compute operands, and results, among other things. This data can be stored in the tile memories, or in the shared memory 118. In some implementations the core processor 112 operates on an ARC, Alpha, Am29000, ARM, Atmel AVR, Blackfin, i860, 1960, M88000, MIPS, PA-RISC, Power ISA, RISC-V, SuperH, SPARC, or other processing architecture.

Tiles 116 can be custom computing cores configured to run inferences. Each tile 116 can include a memory and receive inputs and outputs, which can be shared from tile to tile, or from the between the core processor 112 and the tiles 116. In addition to their own memory (e.g. SRAM) each tile 116 can access the shared memory 118 via high-speed network 122. The tiles 116 are described in greater detail below with respect to FIGS. 6 and 7.

Figure 2:
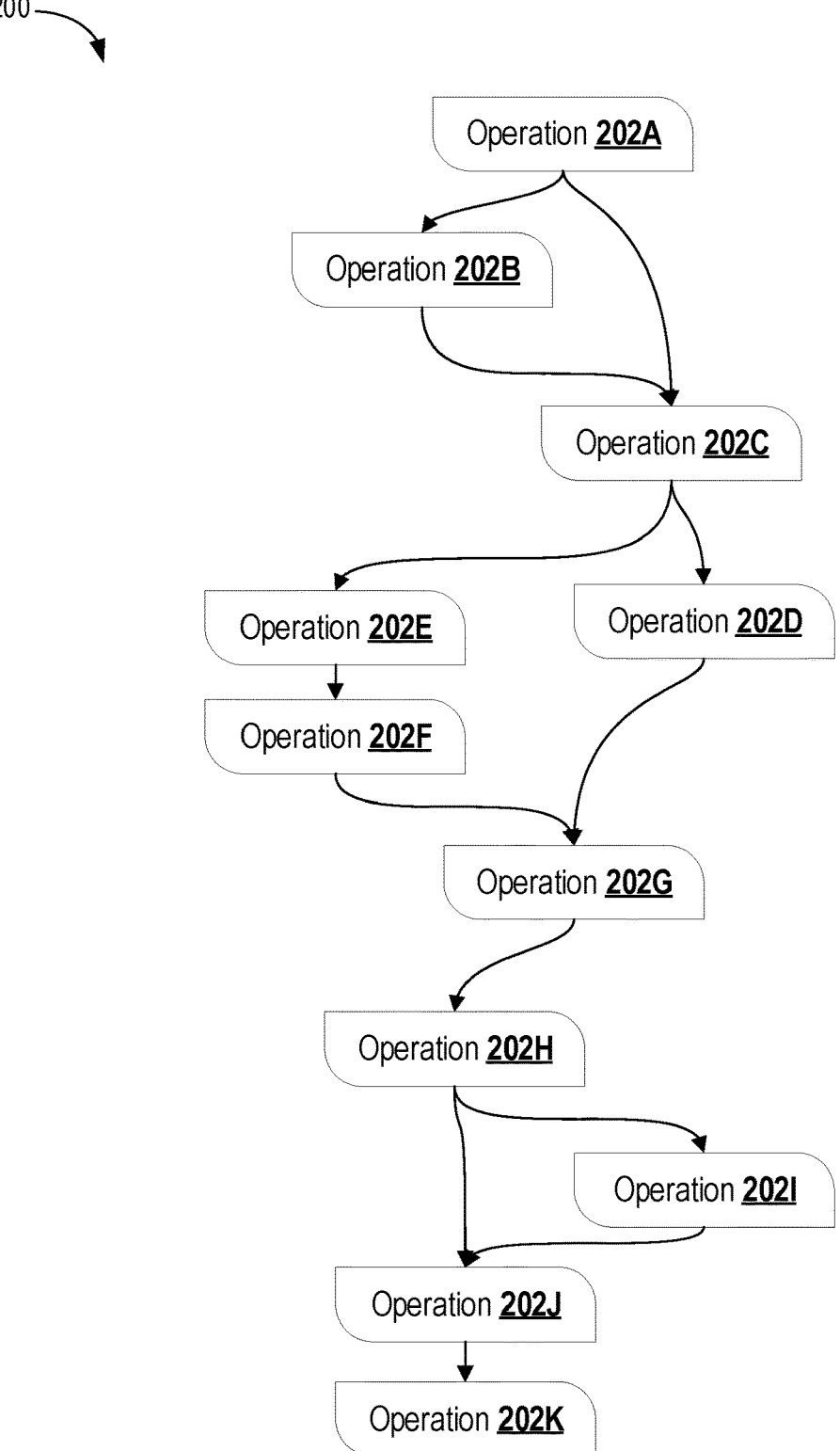
FIG. 2 is a diagram illustrating an example execution graph.

FIG. 2 is a diagram illustrating an example execution graph 200. The execution graph 200 includes a plurality of operations 202A-202J to be executed by the machine learning hardware accelerator. Arrows FIG. 2 represent dependencies between operations. For example, operation 202C depends on the outputs of operations 202A and 202B. It should be noted that the illustrated execution graph has been simplified for clarity, and an actual execution graph could consist of many thousands of operations and dependencies. This initial graph can be constructed based on a trained machine-learning model that is to be executed. For example, a MLIR file can be provided and can be compiled, or partially compiled to generate a list of operations and dependencies and construct an execution graph 200.

The execution graph 200 can describe generally the operations that are required to occur in order to perform an inference. Operations can be fundamental level computations (e.g., AND operations, OR operations, or XOR operations) or higher-level computations such as comparisons and averages. Not all operations have equal computational expense, and some operations perform faster or more efficiently on particular core types. For example, an operation that requires a series of sequential calculations may be more suited to an ARM type processor or similar (E.g., core processor 112 of FIG. 1). In another example, a group of parallel operations that share a single input may be best suited for a parallel processor such as a GPU or a TPU (e.g., tiles 116 of FIG. 1).

Figure 3A:
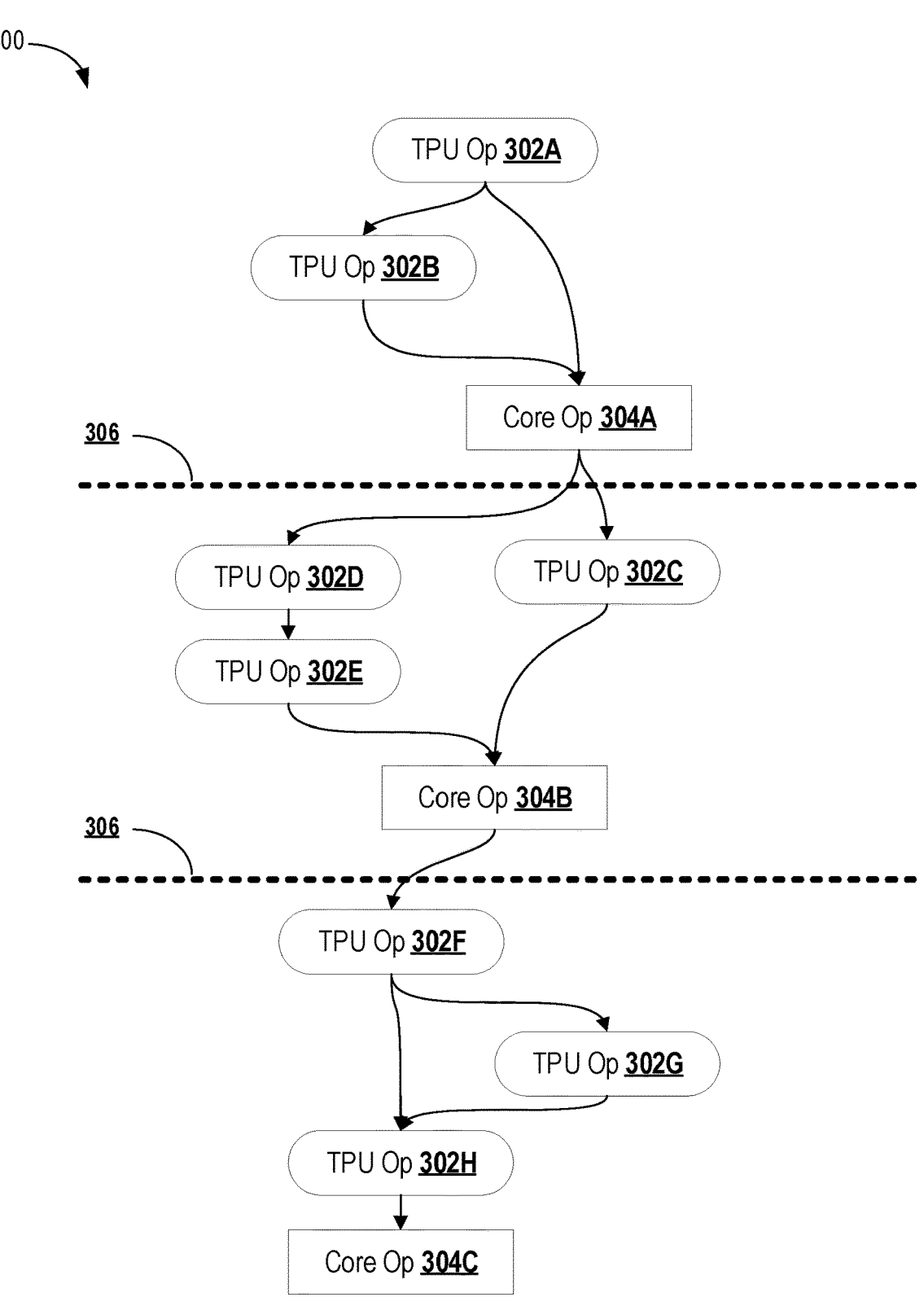
FIG. 3A is a diagram illustrating an example execution graph with partitions and assignments.

FIG. 3A is a diagram illustrating an example execution graph with partitions and assignments. For instance, in order to improve the machine learning hardware accelerator's efficiency at executing the execution graph, it can be further processed when it is compiled for a particular inference on a particular hardware accelerator. For example, compiling this graph can assign each partition 306 to a specific ASIC, and each operation 302 to a particular core for execution.

An execution graph can be executed in a distributed environment, and the manner in which operations are divided amongst various processing units can influence the efficiency and speed of the inference being executed. At compile time, a hardware configuration is determined. For example, a host system can use 10 multi-core devices (e.g., Google TPUs) to execute a particular inference. Each multi-core device can have multiple processing cores, and multiple core types. For example, a multi-core device can have an array of processing "tiles" (e.g., tiles 116 as described with respect to FIG. 1) and one or more core processors. Once the hardware configuration that will be executing the inference is known, the execution graph 300 can be further defined and optimized for execution on the known hardware configuration.

The execution graph can be partitioned into various subgraphs. The partitions 306 can be selected to separate groups of relatively independent operations. In some implementations, the partitions can represent checkpoints, or synchronization points in the inference, where the hardware accelerator will synchronize parameters prior to continuing execution. In some implementations, each portion of the execution graph 300 after partitioning can be divided amongst the processing devices of the hardware accelerator to maximize parallel computing.

Each operation in the execution graph 300 can be assessed and a preferred processing core can be selected for that operation. For example, operations 302A-302H are more suited to being performed on a TPU tile, and therefore should preferentially be executed by a TPU tile. Operations 304A-304C are more suited to being performed on a core processor, and therefore can preferentially be executed at the core processor of an ASIC (e.g., core processor 112 of FIG. 1). In some implementations, the preferred core is not necessarily the core upon which the operation is executed. For example, if there is a sequence of operations with alternating preferred core types, it may be more optimal to perform all the operations on a single core to minimize communication traffic within the hardware accelerator. Additionally, while only two preferred core types (operations 302 and 304) are illustrated, three or more preferred types are contemplated by this disclosure. For example, some operations may be best suited to a host system CPU (e.g., CPU 104 of FIG. 1) and therefore should be executed by the host system.

In some implementations, certain operations require a specific core type. For example, some operations may only be executed by an ARM core (or other particular RISC core), and these operations cannot run properly on a TPU tile. For example, in some implementations, gather, scatter, or beam search operations may not be executable by a TPU tile. Operations with a hard core type requirement can be appropriately assigned to their correct core. Many operations can be executed on either core, but will be more efficient on one type. Additionally, combinations or groups of operations may be better suited for a particular core type. Heuristic analysis can be performed to analyze the execution graph 300, or operations 302 and 304 to determine which core type is preferred for each operation. Heuristic analysis can include an assessment of a number of tiles used (e.g., attempt to maximize the number of tiles used). In some implementations, heuristic analysis calculates a time delay or software overhead for each core type.

Once a preferred core type is determined, and the execution graph 300 is separated into partitions, the operations can be assigned to specific hardware of the machine learning hardware accelerator. In general, the assignment of operations to specific hardware components can be based on the operations preferred core type, expected communication traffic, as well as available hardware. For example, a typical machine learning hardware accelerator may have many more TPU tiles than core processors, and therefore may preferentially assign operations to the TPU tiles. Additionally the assignment can be completed hierarchically. For example the host system may distribute large groups of operations among its available ASIC, which then individually assign operations within themselves to specific tiles/processors. In some implementations, the host system need only assign the entire execution graph 300 to a single ASIC, which can distribute portions of the graph in a peer-to-peer manner across the array of ASICs. This is further described with reference to FIG. 3B.

In some implementations, the amount of optimization to be performed on the execution graph 300 during compilation is adjustable. For example, a user can specify a specific amount of time to be spent optimizing and analyzing the execution graph 300 before the inference is to begin.

Figure 3B:
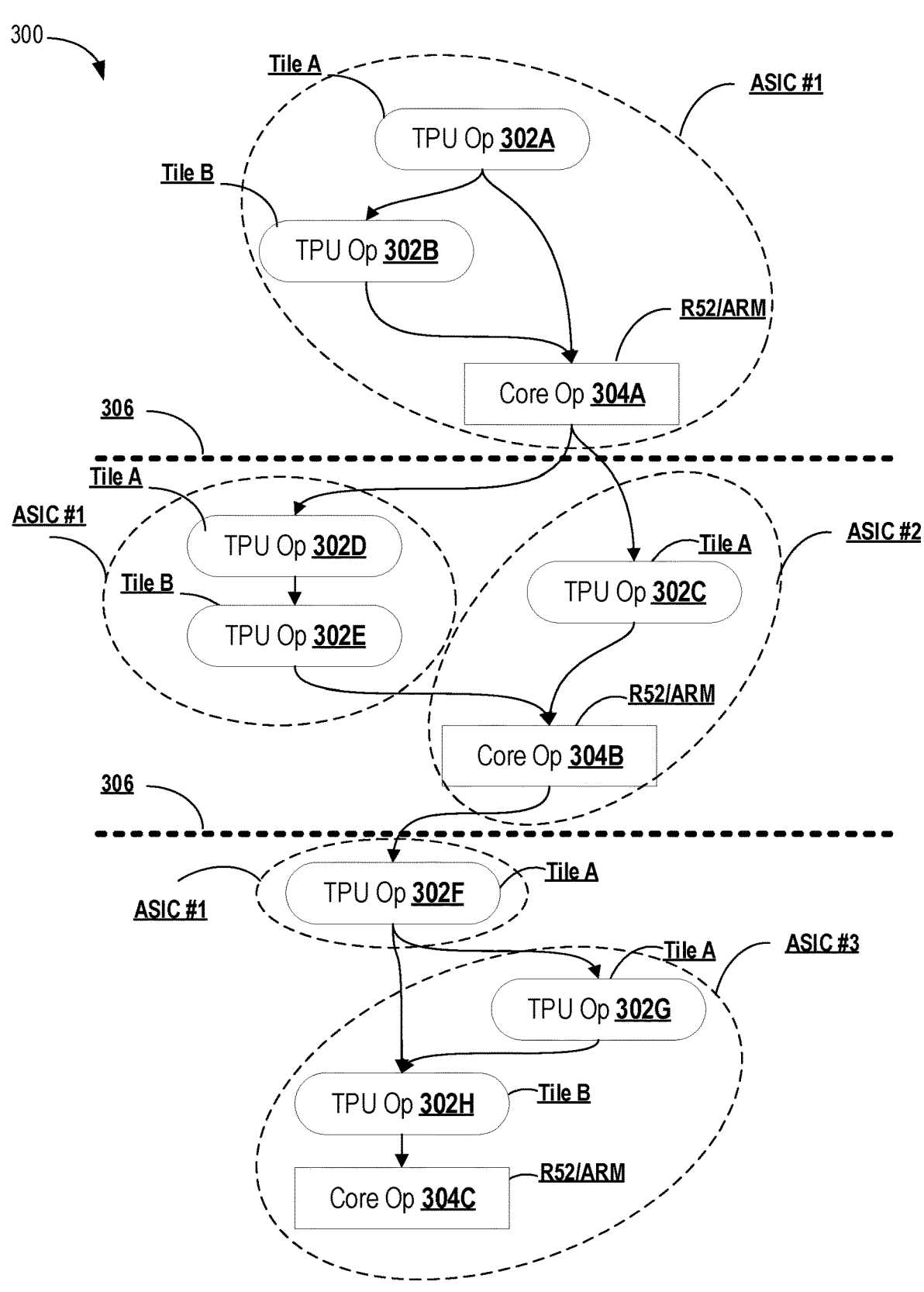
FIG. 3B is a diagram illustrating an example execution graph with additional higher tier assignments.

FIG. 3B is a diagram illustrating an example execution graph with additional higher tier assignments. As shown in FIG. 3A, individual operations, have been assigned to particular cores after their preferred core type is determined. Once the desired core types is determined, for each partition, a specific ASIC can be selected by a higher-level compiler. For example, in the second partition, operations 302D and 302E have been assigned to tiles A and B respectively of ASIC #1 of the hardware accelerator. Meanwhile operations 302C and 304B have been assigned to tile A and an ARM core of ASIC #2.

Due to their hierarchical nature, each tier of assignments need only be made by the associated component of the machine learning hardware accelerator. For example, the host system (e.g., host system 102) can provide execution graph 300 to ASIC #1 of the hardware accelerator. ASIC #1 can then offload operations 302C and 304B to ASIC #2, and assign operations 302D and 302E to tiles A and B respectively. Meanwhile ASIC #2 can receive its assigned operations and distribute them amongst appropriate computing cores (e.g., tiles, or arm cores) in ASIC #2.

FIG. 4 is a flowchart describing an example process for distributing executable jobs in an array of multi-core computing devices. Process 400 can be executed by a machine learning hardware accelerator (e.g., machine learning hardware accelerator 100 as described with respect to FIG. 1) or a portion thereof.

At 402, a plurality of executable jobs are received in an array of multi-core computing devices. The array of multi-core computing devices can be similar to the machine learning hardware accelerator 100 as described with reference to FIG. 1. In some implementations, the plurality of executable jobs can be received as a trained machine learning model or a list of characteristics for a model.

At 404, each job in the plurality of jobs is assigned to a specific core type of the multi-core computing devices. In some instances, an analysis can be performed to determine the core type that is best suited to executing each job. Example core types can include, but are not limited to ARM cores (or other RISC cores), CPUs, GPUs, and TPUs. The analysis can be performed based on a heuristic analysis of the executable jobs, user input, and hardware requirements and availability. Heuristic analysis can determine which jobs or groups of jobs will perform most efficiently on which core type. The user can provide input such as how long to spend analyzing, or what the analysis priorities should be, including parameters defining the heuristic analysis to be performed. In some implementations, the user input can include a desired depth of analysis, which can describe, for example, how many calculations per job to perform in order to decide which core type to which it should be assigned. Hardware requirements can include specific hardware limitations that could require certain jobs to be performed on specific core types. For example, a TPU tile may not be capable of performing a communications routing job that involves transmitting a tensor object return to a separate ASIC. This job may be required to be performed by a core processor in the ASIC itself. Additionally, the available hardware can inform the analysis for assigning jobs. For example, the hardware accelerator can have more of a first type of processing core available than the second. In this example, jobs may be preferentially assigned to the first type of core, based on additional relative availability of the first type of core.

At 406, each job is compiled into an individually executable file according to its core type assignment. These individually executable files can be configured to be consumed by their assigned core type along with one or more inputs to produce one or more outputs. For example, a job assigned a TPU tile is compiled into a TPU executable file. Similarly, a job assigned to an ARM is compiled into an ARM executable file.

At 408, an execution graph is generated which represents a mapping of the individually executable files to specific types of processing cores. The execution graph can identify dependencies between the individually executable files. In some implementations, the execution graph is a node and edge graph, with each node representing an executable file and additional metadata or information, and each edge representing a dependency between two nodes. The execution graph can be similar to execution graphs 200 or 300 as described with respect to FIGS. 2, 3A, and 3B. The execution graph can further be hierarchical and include one or more sub-graphs similar to execution graph 800 as described with reference to FIG. 8 in more detail below. Each node in the execution graph can contain one or more executable files, which can be distributed throughout the machine learning hardware accelerator.

FIG. 5 is a flowchart describing an example process for compiling executable jobs in an array of multi-core computing devices. Process 500 can be executed by a machine learning hardware accelerator (e.g., machine learning hardware accelerator 100 as described with respect to FIG. 1) or a portion thereof.

At 502, the machine learning hardware accelerator receives a machine learning model upon which to perform an inference. The machine learning model can define parameters such as weights and connections between neurons in a neural network as well as number of layers/neurons in each layer etc. The received machine learning model can also include one or more inputs to be provided to the neural network in order to execute the inference, as well as operations to be conducted, and specific inputs, outputs, and parameters to be used by the operations.

At 504, the received machine learning model is parsed to determine a plurality of jobs to be executed. The plurality of jobs can include jobs that are dependent on the results from other jobs, as well as communications between systems and other computations to be completed in order to execute the inference. In some implementations, the jobs are assessed to determine which core type on which the job is preferentially executed. For example, a heuristic analysis, similar to that described above can be conducted to identify the core type on which the jobs will operate best.

At 506, an execution graph representing the plurality of jobs and dependencies between the plurality of jobs is generated. In some implementations, the execution graph is a node and edge diagram, similar to the execution graphs 200 or 300 as described with reference to FIGS. 2 and 3. In some instances, this is completed similarly to 408 as described above.

At 508, a multi-chip compiler is invoked to compile the execution graph into a mapped execution graph. A mapped execution graph is a graph in which all of the jobs have been assigned to the appropriate core type and compiled: the mapped execution graph contains necessary compiled executables to be run in the multi-core machine learning accelerator. In general, the multi-chip compiler divides the graph into sub-graphs to be processed by lower tier compilers. Some jobs, which must be performed at the highest tier are compiled immediately, and the rest of the jobs are further divided into sub-graphs, which are then compiled by their respective compilers. While described as a three-tier hierarchy, with a multi-chip level, single-chip level, and core-level, greater or fewer tiers can be considered within the scope of this disclosure.

At 510, the one or more first jobs of the plurality of jobs are identified which are not compatible with the multi-core computing devices. In other words, these jobs must be executed at a high level (e.g., by a host CPU such as the CPU 104 as described with reference to FIG. 1). For example, execution start, stop, job returns etc. The host CPU may constitute a first core type.

At 512, the remaining jobs of the execution graph are partitioned into a plurality of first sub-graphs representing the single-chip level, and assigned to a multi-core computing device in the array of multi-core computing devices. The array of multi-core computing devices can be ASICs similar to ASIC 108 as described with reference to FIG. 1, and in more detail below with reference to FIGS. 6 and 7.

At 514, a chip-level compiler is invoked to compile each of the first sub-graphs. Each subgraph from the higher tier contains executables to be assigned at the current tier, or further partitioned into an even lower level sub-graph.

At 516, one or more chip-level jobs, which can only performed at the chip level and are not suited for, or are preferentially executed at the chip level are identified. These jobs are, for example, traffic coordination jobs, or synchronization jobs between cores of the multi-core computing device. These jobs are then compiled to be executed by a second core type (e.g., an ARM core controller of the multi-core computing device).

At 518, the remaining jobs of the first sub-graph are partitioned into a plurality of second sub-graphs and assigned to a third core type (e.g., a TPU tile). At 520, a core-level compiler is invoked to process each of the second sub-graphs. At 522, the core-level compiler compiles each of the second sub-graphs into one or more executables to be executed by the third core type (e.g., a TPU tile).

At 524, the resulting mapped execution graph is returned, resulting in an execution graph that contains executables and sub-graphs. Each sub-graph itself containing executables and potentially additional subgraphs. Each graph and sub-graph can specify the core type it is to be executed on in the array of the multi-core computing device.

Figure 6:
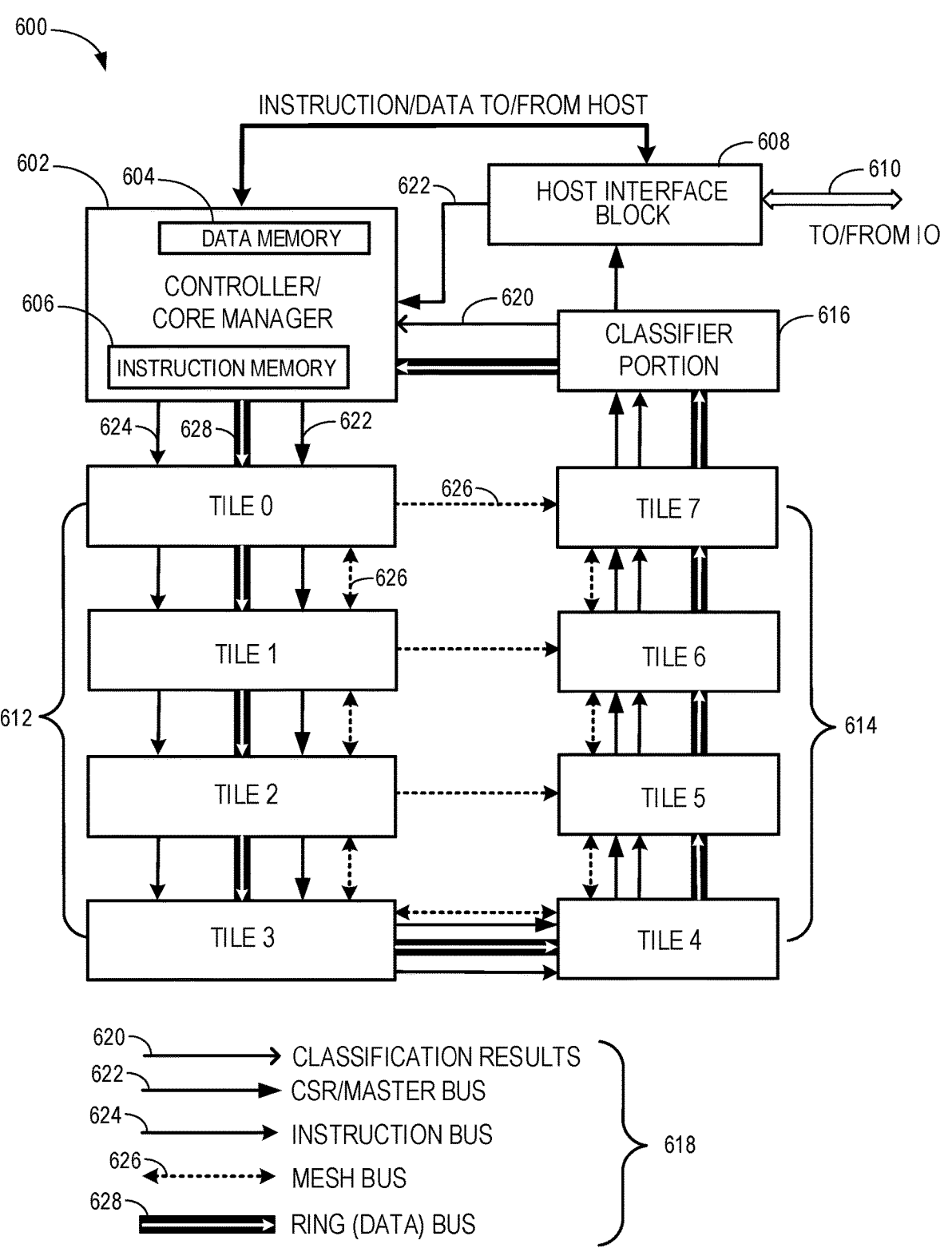
FIG. 6 shows a block diagram of an ASIC used in a machine learning hardware accelerator as an example computing system.

FIG. 6 shows a block diagram of an ASIC used in a machine learning hardware accelerator as an example computing system 600 for accelerating tensor computations associated with deep neural networks (DNNs). The system 600 can be, for example, the ASIC 108 as described with reference to FIG. 1. The system 600 generally includes a controller 602, a host interface 608, an input/output (I/O) link 610, multiple tiles including a first tile set 612 and a second tile set 614, a classifier portion 616, and data buses identified in a bus map 618 (which is shown for clarity, but is not included in the system 600). Tiles of tile set 612 and tile set 614 can be the same as, or different from tiles 116 as discussed with reference to FIG. 1. Controller 602 generally includes data memory 604, instruction memory 606, and at least one processor configured to execute one or more instructions encoded in a computer readable storage medium. Instruction memory 606 may store one or more machine readable instructions that are executable by the one or more processors of controller 602. Data memory 604 may be any of a variety of data storage mediums for storing and subsequently accessing a variety of data relating to computations that occur within system 600.

Controller 602 is configured to execute one or more instructions relating to tensor computations within system 600, including instructions stored in instruction memory 606. In some implementations, data memory 604 and instruction memory 606 are volatile memory unit or units. In some other implementations, data memory 604 and instruction memory 606 are non-volatile memory unit or units. Data memory 604 and instruction memory 606 may also be another form of computer-readable medium, such as a floppy disk device, a hard disk device, an optical disk device, or a tape device, a flash memory or other similar solid state memory device, or an array of devices, including devices in a storage area network or other configurations. In various implementations, controller 602 may also be referenced or referred to as core manager 602.

As depicted, host interface 608 is coupled to I/O link 610, controller 602, and classifier portion 616. Host interface 608 receives instructions and data parameters from I/O link 610 and provides instructions and parameters to controller 602. In general, instructions can be provided to one or more devices in system 600 through instruction bus 624 (described below) and parameters can be provided to one or more devices in system 600 through ring bus 628 (described below). In some implementations, instructions are received by controller 602 from host interface 618 at an initial time and stored in instruction memory 606 for execution by controller 602 at a later time.

Classifier portion 616 is likewise coupled to controller 602 and tile 7 of second tile set 614. In some implementations, classifier portion 616 is implemented as a separate tile within the system 600. In alternative implementations, classifier portion 616 is disposed or located within controller 602 as a sub-circuit or sub-device of controller 602. Classifier portion 616 is generally configured to perform one or more functions on accumulated pre-activation values that are received as outputs of fully connected layers. Fully connected layers may be partitioned across the tiles in tile sets 612 and 614. Thus, each tile is configured to produce a subset of pre-activation values (i.e., linear outputs) which may be stored in a memory unit(s) of the tile. Classification results bus 620 provides a data path from classifier portion 616 to controller 602. Data that includes post-function values (i.e., results) are provided to controller 602 from classifier portion 616 via classification results bus 620.

Bus map 618 shows data buses that provide one or more interconnected data communication paths between tiles of first tile set 612 and second tile set 614. Bus map 618 provides a legend for identifying a classification results bus 620, CSR/master bus 622, instruction bus 624, mesh bus 626, and ring bus 628 as depicted in FIG. 6. In general, a tile is a core component within the accelerator architecture of system 600 and is the focal point for tensor computations that occur in the system. Each tile is an individual computing unit that cooperates with other tiles in the system to accelerate computations across one or more layers of a multi-layer neural network. Although tiles in tile sets 612, 614 can share execution of tensor computations associated with a given instruction, an individual computing unit is a self-contained computational component configured to execute a subset of tensor computations independently relative to other corresponding tiles within tile sets 612, 614.

CSR bus 622 is a single master multiple slave bus that enables controller 602 to transmit one or more instructions that set program configurations and read status registers associated with one or more tiles. CSR bus 622 may be connected in a single daisy chain configuration with one master bus segment and multiple slave bus segments. As shown in FIG. 6, CSR bus 622 provides communications coupling through a bus data path that connects tiles in tile sets 612, 614 and controller 602 in a ring to host interface 610. In some implementations, host interface 610 is the single master of the CSR bus ring and the entire CSR bus address space is memory mapped to a memory space in host interface 610.

CSR bus 622 may be used by host interface 610 to perform one or more operations including, for example, programming memory buffer pointers in controller 602 to enable controller 602 to begin fetching instructions from instruction memory 606, updating/programming various tile settings (e.g., coefficient tables for polynomial approximation calculations) that remain static during one or more computations, and/or loading/reloading firmware to classification portion 616. In one example, firmware reloads may include new functions to be applied to linear outputs (i.e., pre-activation values). Accordingly, every slave having access to CSR bus 622 will have a distinct node identifier (node ID) that is tied to the slave and identifies it. The node ID will be part of an instruction address and will be used, inspected or otherwise examined by the CSR slaves (i.e., controller 602, tiles 612, 614 and classifier 616) to determine whether the CSR packet is addressed to the slave.

In some implementations, one or more instructions can be transmitted by host interface 602 through controller 602. The instructions may, for example, be 32-bits wide with the first 7-bits including header information indicating the instruction address/destination that is to receive and execute the instructions. The first 7-bits of the header may contain data parameters that represent a particular node ID. Slaves (e.g., each tile) on the CSR bus ring may therefore inspect the header of the instruction to determine if the request by the master (host interface 610) was addressed to the tile inspecting the header. If the node ID of the header does not indicate that the destination is the inspecting tile, the inspecting tile will copy the input CSR instruction packet to the CSR bus input connected to the next tile for inspection by the next tile.

Instruction bus 624 originates from controller 602 and, similar to CSR bus 622, also provides communications coupling through a bus data path that connects tiles in tile sets 612, 614 in a ring back to controller 602. In one implementation, controller 602 broadcasts one or more instructions via instruction bus 624. The instructions that are broadcast by controller 602 may differ from the instructions provided via CSR bus 622. However, the manner in which a tile receives and/or consumes or executes the instruction received via bus 624 may be similar to the process for executing instructions received via CSR bus 622.

In one example, a header (i.e., a bitmap) of the instruction indicates, to a receiving tile, that the receiving tile needs to consume a particular instruction based on a bitmap associated with the instruction. The bitmap may have a particular width defined in terms of bits. The instruction is typically forwarded from one tile onto the next tile based on parameters of the instruction. In one implementation, the width of instruction bus 624 may be configured to be smaller than the size/width of the instruction. Thus, in such a configuration, transmission of the instructions will be over several cycles and bus stops of instruction bus 624 will have decoders to place instructions received at the tile in the appropriate target instruction buffer associated with that tile.

As described further below, the tiles in tile sets 612, 614 are generally configured to support two broad categories of instructions. The two broad categories may also be referred to as instruction types. The instruction types include a tensor operation (TensorOp) instruction and a direct memory access (DMAOp) instruction. In some implementations, DMAOp instructions have one or more specializations that are allowed to be concurrent. The one or more specializations may be referred to as DMAOp instruction subtypes or opcodes. In some cases, every unique and/or valid DMAOp instruction type/subtype tuple will have a separate instruction buffer within a particular tile.

At a particular tile of tiles 612, 614, the bus stop associated with instruction bus 624 will examine the header bitmap to determine the instruction type/subtype. The instruction may be received by the tile and subsequently written to an instruction buffer of the tile prior to execution of the instruction by the tile. The instruction buffer of the tile in which the instruction is written may be determined by the type and subtype indicator/field of the instruction. The instruction buffers may include a first-in first-out (FIFO) control scheme that prioritizes consumption of one or more related instructions. Thus, under this FIFO control scheme, instructions of the same type/subtype will always be executed in the order in which the instruction arrived on the instruction bus.

The different instruction buffers within a tile are the TensorOp instruction buffers and the DMAOp instruction buffers. As indicated above, instruction types include the TensorOp instruction and the DMAOp instruction. With regard to DMAOp instructions, instruction subtypes (indicating a 'write-to' buffer location) include the following: 1) mesh inbound instruction buffer: 2) mesh outbound instruction buffer: 3) narrow-wide DMA instruction buffer: 4) wide-narrow DMA instruction buffer; and 5) ring bus DMA instruction buffer. These buffer locations will be described in more detail below with reference to FIG. 7. Wide and narrow designations are used throughout the specification and generally refer to an approximate size in width (bits/bytes) of one or more memory units. As used herein, "narrow" may refer to one or more memory units each having a size or width of less than 16-bits and "wide" may refer to one or more memory units each having a size or width or less than 64-bits.

Mesh bus 626 provides a data communications path that is distinct from CSR bus 622, instruction bus 624, and ring bus 628 (described below). As depicted in FIG. 6, mesh bus 626 provides a communications path that couples or connects each tile to its corresponding neighbor tile in both the X and Y dimensions. In various implementations, mesh bus 626 may be used to transport input activation quantities between one or more narrow memory units in adjacent tiles. As shown, mesh bus 626 does not allow direct forwarding of input activation data to non-adjacent tiles.

In various implementations, mesh bus 626 and the various tiles connected via mesh bus 626 may have the following configuration. Four corner tiles of the mesh have two outbound ports and two inbound ports. Four edge tiles of the mesh have three inbound ports and three outbound ports. All non-edge, non-corner tiles have four inbound ports and four outbound ports. In general, given an example N×N tile layout, edge tiles are tiles with only three neighbor tiles while corner tiles are tiles with two neighbor tiles. Regarding data flow methodology via mesh bus 626, in general, every input activation that arrives via mesh bus 626 for a particular tile must be committed to one or more narrow memory units of the tile. Moreover, for tile configurations that have fewer than four inbound ports, DMAOp instructions may write zero values to the locations in the tile's narrow memory instead of waiting for data on an absent input port. Likewise, for tile configurations that have fewer than four outbound ports, DMAOp instructions will not execute the narrow memory reads and port writes related to transfers for any absent ports.

In some implementations, a location or address of a narrow memory unit(s) that a particular input activation will be written to, or read from, will be generated by a Tensor Traversal Unit (hereinafter "TTU") based on inbound/outbound DMAOp provided via mesh bus 626. An inbound DMAOp and an outbound DMAOp may be executed concurrently and any required synchronization will be managed through sync flag control schemes administered by controller 602. TTUs are described in further detail below with reference to FIG. 7.

Ring bus 628 originates from controller 602 and, similar to CSR bus 622 and instruction bus 624, also provides communications coupling through a bus data path that connects tiles 612, 614 in a ring back to controller 602. In various implementations, ring bus 628 generally connects or couples all wide memory units (described in more detail below with reference to FIG. 7) in all tiles 612, 614. Thus, a payload width of ring bus 628 corresponds to the width of the wide memory units disposed within each tile of tile sets 612, 614. As discussed above, ring bus 628 also includes a bitmap header indicating the tiles that need to consume payload data comprising instructions or parameters communicated via ring bus 628.

With regard to data (i.e., payload) received at a particular tile via ring bus 628, in response to receiving the information, each tile will zero (i.e., clear out) position data indicated in the bitmap header that is unique to the receiving tile before forwarding the data on to another tile. Hence, when the header bitmap has no remaining bit set data indicating a particular tile that is to receive the payload, forwarding of the payload to another tile will stop. Payload data generally refers to activations and weights used by one or more tiles during tensor computations performed based on execution of deeply nested loops.

In some implementations, controller 602 may be described as being a part of ring bus 628. In one example, for DMAOp instructions executed within a particular tile, controller 602 may be used to pop the data/payload from ring bus stops and forward the payload to a ring bus stop in a next tile in the ring. Controller 602 may also cause the payload data to be committed to one or more wide memory units of the tile if such action is required by instructions in the bitmap header. The address of the one or more wide memory units to which the data needs to be written may be generated by DMAOp instructions within the particular tile.

In various implementations, each tile of tile set 612, 614 can either be a producer of payload data or a consumer of payload data. When a tile is a producer of payload data the tile reads the data from one or more of its wide memory units and multicasts the data over ring bus 628 for consumption by one or more other tiles. When a tile is a consumer of payload data the tile receives and writes the data to one or more wide memory units within the tile and forwards the payload data for consumption by one or more other tiles. With regard to movement of payload data via ring bus 628, there typically will only be one producer/master of data on ring bus 628 at any given time. The DMAOp instruction execution order (e.g., FIFO control scheme) in all tiles will ensure there is only one producer/master of data on ring bus 628 at a given time.

In some implementations, controller 602 uses a sync flag control architecture to ensure there is only one producer/master of payload data on ring bus 628 at a given time. In one example, every write by a tile to a ring output will trigger an increment of the corresponding sync flag count. Controller 602 may examine the payload data to determine the number of data chunks or segments that comprise the payload. Controller 602 then monitors execution by the tile to ensure the expected number of data segments are forwarded and/or consumed by the tile before another tile executes in master mode.

An exception to ensuring there is only one producer/master of data on ring bus 628 at a given time occurs when there are local multicast groups connected via ring bus 628 that do not have an overlapping region on the ring bus. For example, tile 0 (master) may multicast (i.e., produce data) to a tile in Tile 0-Tile 3 grouping, while Tile 4 (master) may do the same to a tile in Tile 4-Tile 7 grouping. An important requirement of this dual master multicast methodology is that different multicast groups must not be allowed to see each other's data packets because packet overlap may occur and lead to one or more data computation errors.

As shown in FIG. 6, controller 602 provides a communications data path that couples or connects tiles in tile sets 612, 614 to I/O 610 and includes several core functions. The core functions of controller 602 generally include feeding one or more I/O input activations to tiles in tile sets 612, 614, feeding one or more input activations and parameters received from I/O 610 to the tiles, feeding one or more instructions received from I/O 610 to the tiles, sending I/O output activations to host interface 608, and serving as a ring stop for CSR bus 622 as well as ring bus 628. As described in more detail below; first tile set 612 and second tile set 614 each include multiple tiles that are used to perform one or more tensor computations that are executed based on a deep loop nest comprised of inner and outer loops.

System 600 generally operates as follows. Host interface 608 will provide one or more instructions to controller 602 that define direct memory access operations (DMAOp) that occur for a given computation. Descriptors associated with instructions fed to controller 602 will include information required by the controller to facilitate large scale dot product computations associated with multi-dimensional data arrays (tensors). In general, controller 602 receives, from host interface 608, input activations, tile instructions, and model parameters (i.e., weights) for executing tensor computations for a given layer of a neural network. Controller 602 may then cause the instructions to be multicast to tiles 612, 614 in a data flow manner defined by the instruction(s). As discussed above, tiles consuming an instruction may then initiate a broadcast of a new/subsequent instruction to another tile based on bitmap data in the instruction header.

With regard to data flow, input activations and parameters are transmitted to tiles of tile sets 612, 614 via ring bus 628. Each of tiles 612, 614 will store a subset of the input activations needed to compute a subset of output activations that are assigned to that particular tile. DMAOp instructions for a tile will cause the input activation to be moved from wide memory to narrow memory. Computation within a tile begins when required input activations, parameters/weights and computation instructions (TTU operations, memory addresses, etc.) are available in the tile. Computations occurring within a tile ends when MAC operators (described below) within a tile complete all dot product operations defined by the instruction set and pre-activation functions are applied to the results (i.e., output activations) of the multiplication operations.

Results of the one or more tensor computations include writing output activations of a compute layer to a narrow memory unit(s) of the tile performing the computation. For certain tensor computations, there will be a transfer of output edge activations to neighboring tiles via mesh bus 626. Transfer of output edge activations to neighboring tiles are required to compute output activations for a subsequent layer when computations span multiple layers. When computations for all layers are complete, a DMAOp will move final activations to classifier tile 616 through ring bus 628. Controller 602 will then read final activations from classifier tile 616 and execute a DMAOp to move the final activations to host interface 608. In some implementations, classifier portion 616 performs computations of an output layer (i.e., the last layer) of the NN. In other implementations, the output layer of the NN is one of a classifier layer, a regression layer, or another layer type that is generally associated with neural networks.

Figure 7:
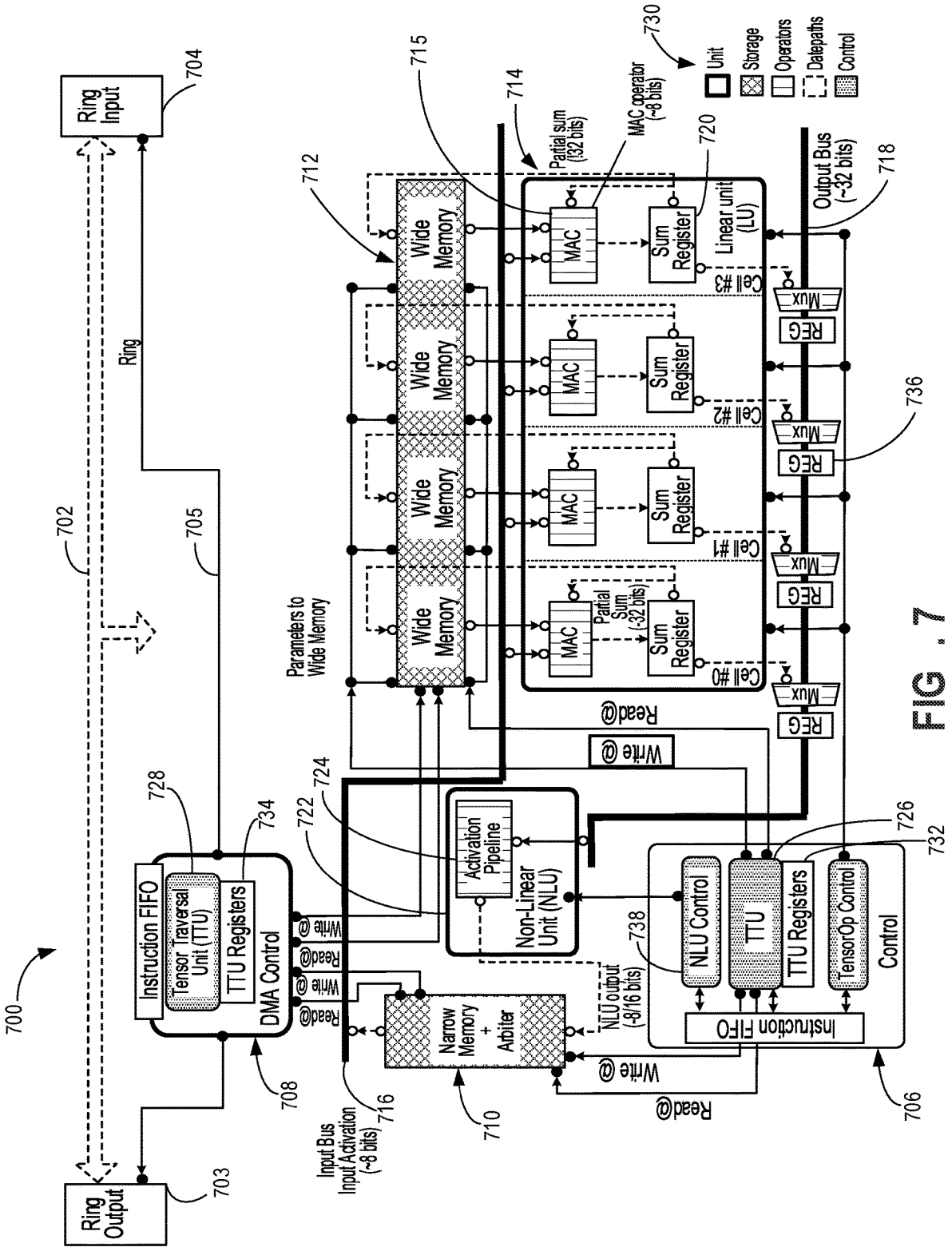
FIG. 7 illustrates an example neural network (NN) compute tile.

FIG. 7 illustrates an example neural network (NN) compute tile 700 which could be used in an ASIC 106 as described with reference to FIG. 1. Generally, the example tile 700 may correspond to any of the tiles within first tile set 612 and second tile set 614 discussed above with reference to FIG. 6. In various implementations, compute tile 700 may also be referenced or referred to as computing unit 700. Each compute tile 700 is a self-contained computational unit configured to execute instructions independently relative to other corresponding tiles within tile sets 612, 614. As discussed briefly above, each compute tile 700 executes two types of instructions, a TensorOp instruction and a DMAOp instruction. In general, each instruction type will include compute operations associated with deep loop nests and thus each instruction type will generally execute over multiple time epochs to ensure completion of all loop iterations.

As discussed in more detail below, the different instruction types are executed by independent control units within compute tile 700 that synchronize on data through sync flag controls that are managed within compute tile 700. The sync flag controls manage concurrency between executions of different instruction types within compute tile 700. Each compute operation associated with each instruction type will be executed in strict order of issuance (i.e., First-In First-Out). With regard to the two instruction types, TensorOP and DMAOp, there are no ordering guarantees between these different instruction types and each type is treated by compute tile 700 as a separate thread of control.

With regard to data flow constructs, compute tile 700 generally includes data path 702 and data path 705 that each provide a communications path for data flow into and out of compute tile 700. As described above, system 600 includes three distinct data bus structures that are laid out in a ring configuration—CSR bus 622, instruction bus 624, and ring bus 628. Referring to FIG. 7, data path 705 corresponds to instruction bus 624, while data path 702 generally corresponds to one of CSR bus 622 and ring bus 628. As shown, data path 702 includes a ring output 703 providing an output path for data leaving compute tile 700 and a ring input 704 providing an input path for data entering compute tile 700.

Compute tile 700 further includes a TensorOp control 706 including a TensorOp tensor traversal unit (TTU) 726 and a DMAOp control 708 including a DMAOp TTU 728. TensorOp control 706 generally manages writes to and reads from TensorOp TTU register 732 and administers traversal operations for execution by TensorOp TTU 726. Likewise, DMAOp control 708 generally manages writes to and reads from DMAOp TTU register 734 and administers traversal operations for execution by DMAOp TTU 728. TTU register 732 includes instruction buffers for storing one or more instructions comprising operations to be performed by TensorOp TTU 726 upon execution of the instructions by TensorOp control 706. Likewise, TTU register 734 includes instruction buffers for storing one or more instructions comprising operations to be performed by TTU 708 upon execution of the instructions by DMAOp control 708. As described further below, TTUs are used by compute tile 700 to traverse array elements of one or more tensors that generally reside in narrow memory 710 and wide memory 712.

In some implementations, certain instructions for execution by compute tile 700 arrive at the tile via data path 705 (i.e., a portion of instruction bus 624). Compute tile 700 will examine the header bitmap to determine the instruction type (TensorOp or DMAOp) and the instruction subtype (read operation or write operation). Instruction(s) received by compute tile 700 are subsequently written to a particular instruction buffer depending on the instruction type. In general, instructions are received and stored (i.e., written to the buffer) prior to execution of the instruction by a component of compute tile 700. As shown in FIG. 7, the instruction buffers (i.e., TensorOp TTU register 732 and DMAOp TTU register 734) may each include a first-in first-out (FIFO) control scheme that prioritizes consumption (execution) of one or more related instructions.

As discussed briefly above, a tensor is a multi-dimensional geometric object and example multi-dimensional geometric objects include matrices and data arrays. An algorithm, including deeply nested loops, may be executed by compute tile 700 to perform tensor computations by iterating one or more nested loops to traverse an N-dimensional tensor. In one example computational process, each loop of the loop nest may be responsible for traversing a particular dimension of the N-dimensional tensor. As described herein, TensorOp control 706 generally administers one or more tensor operations that drive the sequence in which dimensional elements of a particular tensor construct are traversed and accessed to complete computations defined by the deep nested loops.

Compute tile 700 further includes a narrow memory 710 and a wide memory 712. Narrow and wide designations generally refer to a size in width (bits/bytes) of the memory units of narrow memory 710 and wide memory 712. In some implementations, narrow memory 710 includes memory units each having a size or width of less than 16-bits and wide memory 712 includes memory units each having a size or width or less than 32-bits. Generally, compute tile 700 receives input activations via data path 705 and DMA control 708 executes an operation to write the input activations into narrow memory 710. Likewise, compute tile 700 receives parameters (weights) via data path 702 and DMA control 708 executes an operation to write the parameters into wide memory 712. In some implementations, narrow memory 710 can include a memory arbiter typically used in shared memory systems to decide, for each memory cycle, which control device (e.g., TensorOp control 706 or DMAOp control 708) will be allowed to access that shared memory units of narrow memory 710.

Compute tile 700 further includes an input activation bus 716 and a MAC array 714 including multiple cells that each include a MAC operator 715 and a sum register 720. In general, MAC array 714 executes, using MAC operators 715 and sum registers 720 across multiple cells, tensor computations that include arithmetic operations relating to dot product computations. Input activation bus 716 provides a data path in which input activations are provided, by narrow memory 710, one-by-one for respective access by each MAC operator 715 of MAC array 714. Hence, based on the one-by-one broadcast of an input activation, a single MAC operator 715 of a particular cell will each receive an input activation. Arithmetic operations performed by the MAC operators of the MAC array 714 generally include multiplying an input activation provided by narrow memory 710 with a parameter accessed from wide memory 712 to produce a single output activation value.

During arithmetic operations, partial sums may be accumulated and stored in a corresponding, e.g., sum register 720, or written to wide memory 712 and re-accessed by a particular cell of MAC array 714 to complete follow-on multiply operations. The tensor computations can be described as having a first portion and second portion. The first portion is complete when multiply operations produce an output activation, for example, by completing a multiplication of an input activation and a parameter to generate the output activation. The second portion includes application of a non-linear function to an output activation and the second portion is complete when the output activation is written to narrow memory 710 after application of the function.

Compute tile 700 further includes an output activation bus 718, a non-linear unit (NLU) 722 comprising an output activation pipeline 724, an NLU control 738, and a reference map 730) that indicates a core attribute of a component in compute tile 700. Reference map 730 is shown for clarity, but is not included in the compute tile 700. Core attributes include whether a particular component is a unit, a storage device, an operator, a control device or a data path. In general, upon completion of the first portion of the tensor computations, output activations are provided from MAC array 714 to NLU 722 via output activation bus 718. After arrival at NLU 722, data specifying an activation function, received via activation pipeline 724 is applied to the output activations and the output activations are then written to narrow memory 710. In some implementations, output activation bus 718 includes at least one pipelined shift register 736 and completing the second portion of the tensor computations includes using a shift register 736 of activation bus 718 to shift output activations toward narrow memory 710.

With regard to dot product computations of, for example, two multi-dimensional data arrays, for a single compute tile 700, MAC array 714 provides robust single instruction multiple data (SIMD) functionality. SIMD generally means that all parallel units (multiple MAC operators 715) share the same instruction (based on the deep loop nest), but each MAC operator 715 executes the instruction on different data elements. In one basic example, adding the arrays [1, 2, 3, 4] and [5, 6, 7, 8] element-wise to obtain the array [6, 8, 10, 12] in one cycle will typically require four arithmetic units to execute the operation on each element. By using SIMD, the four units can share the same instruction (e.g., "add") and perform computations in parallel. Thus, system 600 and compute tile 700 provides enhanced acceleration and parallelism in tensor computations over prior methods.

In one example, and as described in more detail below, a single instruction can be provided by controller 602 to multiple compute tiles 700 (see tile sets 612, 614 of FIG. 6) for consumption by multiple MAC arrays 714. In general, neural network layers can include multiple output neurons and the output neurons can be partitioned such that tensor computations associated with a subset of output neurons can be assigned to a particular tile of tile sets 612, 614. Each tile of tile sets 612, 614 can then perform related tensor computations on different groups of neurons for a given layer. Compute tile 700 can therefore provide at least two forms of parallelism: 1) one form includes partitioning the output activations (corresponding to the subset of output neurons) amongst the multiple tiles of tile set 612, 614; and 2) another form includes simultaneous computation (with a single instruction) of multiple subsets of output neurons based on the partitioning amongst the tiles of tile sets 612, 614.

Figure 8:
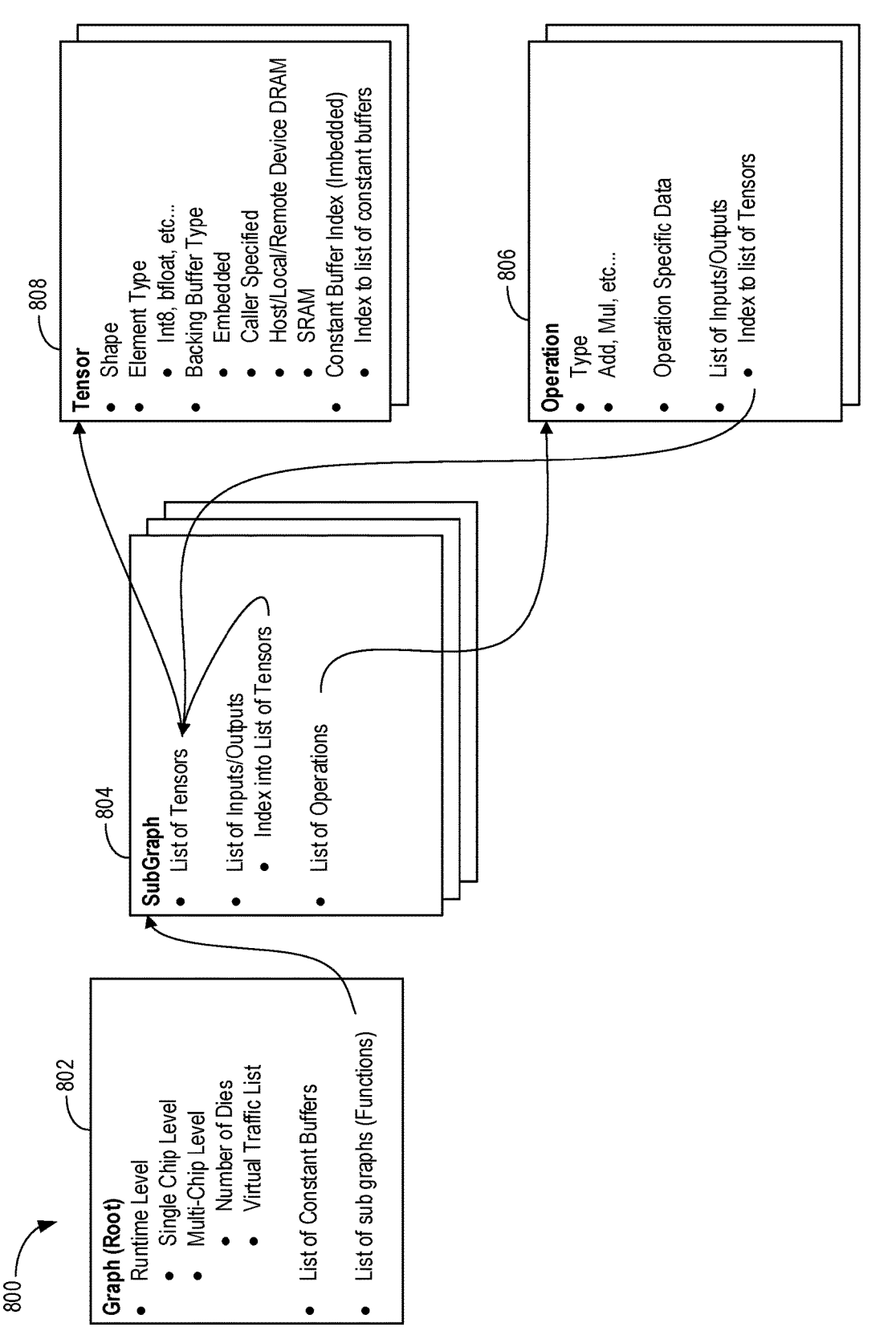
FIG. 8 illustrates an example hierarchical execution graph.

FIG. 8 Illustrates an example hierarchical execution graph. The illustrated hierarchical execution graph 800 shows a higher level graph which can be similar to execution graphs 200 or 300 as described with respect to FIGS. 2 and 3. In some implementations, the execution graph 800 is produced by a process similar to process 400, or process 500 as described with reference to FIGS. 4 and 5.

The root graph 802 describes the entire execution graph 800. It includes runtime level instructions, multi-chip level instructions, single chip level instructions, lists and parameters defining the hardware layout it is to be executed on, a list of constant buffers which can define variables an memory space for the inference, and a list of sub-graphs 804.

Each sub-graph 804 contained in the root graph 802 includes a list of tensors 808, and a list of operations 806. The sub-graph 804 further includes a list of inputs and outputs, and an index defining tensor parameters and storage locations. Additionally, sub-graph 804 can include further sub-graphs (not illustrated) which can provide additional tiers to the hierarchical execution graph 800.

Operations 806 contained within the sub-graph 804 can be compiled executables which have a specific type definition, as well as additional data specific to the operation. The operations 806 can include metadata, specifying a preferred core type, or other parameters associated with their execution. The operations, similar to the sub-graphs can include a list of inputs and outputs that can include an index identifying the location of various tensors or other data required for the operation to execute. In some implementations, a tensor is a multidimensional array of elements, where all the elements are a single known data type.

Tensors 808 define data that is ingested and processed by various sub-graphs 804 and operations 808, as well as potentially the root graph 802. Each tensor 808 can have predefined dimensions, or shape, as well as a predefined variable type. In some implementations, the tensors are stored in a shared memory, accessible by multiple cores or computing devices.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, although bus lines are described as "controllable," not all bus lines need to have the same level of control. For instance, there can be varying degrees of controllability, where some bus lines can be controlled only where some bus lines are restricted in terms of the number of tiles from which they can source data or to which they can send data. In another example, some bus lines may be dedicated to providing data along a single direction, such as north, east, west, or south as described herein. In some cases, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method for distributing executable jobs in an array of multi-core computing devices, comprising:

receiving a plurality of jobs to be executed in the array of multi-core computing devices, each multi-core computing device comprising a plurality of different types of processing cores, wherein the plurality of different types of processing cores comprises a core processor and a tensor processing unit (TPU) tile processor;

assigning each particular job of the plurality of jobs to be executed by one of the plurality of different types of processing cores by:

analyzing the particular job to determine which of the plurality of different types of processing cores is suited to executing the particular job;

assigning the particular job to a core type based on the analysis;

compiling each job of the plurality of jobs into an individually executable file; and generating an execution graph representing a mapping of the individually executable files to specific ones of the plurality of different types of processing cores, wherein the execution graph identifies dependencies between individually executable files, wherein the execution graph is hierarchical in nature comprising sub-graphs arranged in at least three tiers comprising:

a TPU tier, comprising executables to be run on the TPU tile processor;

a chip-level tier, comprising one or more sub-graphs of the TPU tier and executables to be run on the core processor; and a host-level tier, comprising a multi-chip tier sub-graph and one or more sub-graphs configured to be executed on a core of a third type.

2. The method of claim 1, further comprising:

executing the individually executable files by:

receiving the execution graph;

assigning jobs in the execution graph to a plurality of multi-core computing devices in the array of multi-core computing devices;

executing, by each multi-core computing device, the assigned jobs;

returning, by each multi-core computing device, outputs of the executed jobs to a shared memory; and combining the returned outputs to generate an execution graph return.

3. The method of claim 1, wherein analyzing the particular job is completed using a heuristic analysis.

4. The method of claim 1, wherein a depth of analyzation for each particular job is selected based on a user input prior to compile time.

5. The method of claim 1, wherein the execution graph comprises a multi-chip tier, comprising two or more chip-level sub-graphs.

6. The method of claim 5, wherein the core of the third type is a host device central processing unit (CPU).

7. A non-transitory computer-readable storage medium coupled to one or more processors and having instructions stored thereon which, when executed by the one or more processors, cause the one or more processors to perform operations for distributing executable jobs in an array of multi-core computing devices, the operations comprising:

receiving a plurality of jobs to be executed in the array of multi-core computing devices, each multi-core computing device comprising a plurality of different types of processing cores, wherein the plurality of different types of processing cores comprises a core processor and a tensor processing unit (TPU) tile processor;

assigning each particular job of the plurality of jobs to be executed by one of the plurality of different types of processing cores by:

analyzing the particular job to determine which of the plurality of different types of processing cores is suited to executing the particular job;

assigning the particular job to a core type based on the analysis;

compiling each job of the plurality of jobs into an individually executable file; and generating an execution graph representing a mapping of the individually executable files to specific ones of the plurality of different types of processing cores, wherein the execution graph identifies dependencies between individually executable files, wherein the execution graph is hierarchical in nature comprising sub-graphs arranged in at least three tiers comprising:

a TPU tier, comprising executables to be run on the TPU tile processor;

a chip-level tier, comprising one or more sub-graphs of the TPU tier and executables to be run on the core processor; and a host-level tier, comprising a multi-chip tier sub-graph and one or more sub-graphs configured to be executed on a core of a third type.

8. The computer-readable medium of claim 7, the operations further comprising:

executing the individually executable files by:

receiving the execution graph;

assigning jobs in the execution graph to a plurality of multi-core computing devices in the array of multi-core computing devices;

executing, by each multi-core computing device, the assigned jobs;

returning, by each multi-core computing device, outputs of the executed jobs to a shared memory; and combining the returned outputs to generate an execution graph return.

9. The computer-readable medium of claim 7, wherein analyzing the particular job is completed using a heuristic analysis.

10. The computer-readable medium of claim 7, wherein a depth of analyzation for each particular job is selected based on a user input prior to compile time.

11. The computer-readable medium of claim 9, wherein the execution graph comprises a multi-chip tier, comprising two or more chip-level sub-graphs.

12. The computer-readable medium of claim 11, wherein the core of the third type is a host device central processing unit (CPU).

13. A system, comprising:

one or more computers; and a computer-readable storage device coupled to the one or more computers and having instructions stored thereon which, when executed by the one or more computer, cause the one or more computers to perform operations for distributing executable jobs in an array of multi-core computing devices, the operations comprising:

receiving a plurality of jobs to be executed in the array of multi-core computing devices, each multi-core computing device comprising a plurality of different types of processing cores, wherein the plurality of different types of processing cores comprises a core processor and a tensor processing unit (TPU) tile processor;

assigning each particular job of the plurality of jobs to be executed by one of the plurality of different types of processing cores by:

analyzing the particular job to determine which of the plurality of different types of processing cores is suited to executing the particular job;

assigning the particular job to a core type based on the analysis;

compiling each job of the plurality of jobs into an individually executable file; and generating an execution graph representing a mapping of the individually executable files to specific ones of the plurality of different types of processing cores, wherein the execution graph identifies dependencies between individually executable files, wherein the execution graph is hierarchical in nature comprising sub-graphs arranged in at least three tiers comprising:

a TPU tier, comprising executables to be run on the TPU tile processor;

a chip-level tier, comprising one or more sub-graphs of the TPU tier and executables to be run on the core processor;

a host-level tier, comprising a multi-chip tier sub-graph and one or more sub-graphs configured to be executed on a core of a third type.

14. The system of claim 13, the operations further comprising:

executing the individually executable files by:

receiving the execution graph;

assigning jobs in the execution graph to a plurality of multi-core computing devices in the array of multi-core computing devices;

executing, by each multi-core computing device, the assigned jobs;

returning, by each multi-core computing device, outputs of the executed jobs to a shared memory; and combining the returned outputs to generate an execution graph return.

15. The system of claim 13, wherein analyzing the particular job is completed using a heuristic analysis.

16. The system of claim 13, wherein a depth of analyzation for each particular job is selected based on a user input prior to compile time.

* * * * *